(12) United States Patent
Kurihara

(10) Patent No.: US 9,507,553 B2
(45) Date of Patent: Nov. 29, 2016

(54) IMAGE FORMING APPARATUS, IMAGE FORMING CONTROL APPARATUS, IMAGE FORMING SYSTEM AND IMAGE FORMING CONTROL PROGRAM

(71) Applicant: Konica Minolta, Inc., Tokyo (JP)

(72) Inventor: Susumu Kurihara, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/243,472

(22) Filed: Apr. 2, 2014

(65) Prior Publication Data
US 2014/0293351 A1 Oct. 2, 2014

(30) Foreign Application Priority Data
Apr. 2, 2013 (JP) .................. 2013-076879

(51) Int. Cl.
*G06K 15/02* (2006.01)
*G06F 3/12* (2006.01)

(52) U.S. Cl.
CPC ........... *G06F 3/1253* (2013.01); *G06F 3/1205* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 6,388,757 | B1 * | 5/2002 | Koga | 358/1.11 |
| 7,644,119 | B1 * | 1/2010 | Anooshfar | 709/203 |
| 8,081,322 | B2 * | 12/2011 | Morikawa et al. | 358/1.1 |
| 2002/0075505 | A1 * | 6/2002 | Murray | 358/1.15 |
| 2006/0026600 | A1 * | 2/2006 | Yoshida | 719/310 |
| 2007/0177178 | A1 * | 8/2007 | Miyata | 358/1.13 |
| 2008/0150908 | A1 * | 6/2008 | Someno | 345/173 |
| 2008/0151330 | A1 * | 6/2008 | Takahata | 358/497 |
| 2008/0297826 | A1 * | 12/2008 | Yamada | 358/1.14 |

(Continued)

FOREIGN PATENT DOCUMENTS

| | | |
|---|---|---|
| JP | 2007-114688 A | 5/2007 |
| JP | 2007-140786 A | 6/2007 |

(Continued)

OTHER PUBLICATIONS

Patent Abstracts of Japan, Publication No. 2008-065467 dated Mar. 21, 2008 (1 page).

(Continued)

*Primary Examiner* — Beniyam Menberu
(74) *Attorney, Agent, or Firm* — Osha Liang LLP

(57) ABSTRACT

The image forming control apparatus is provided with: a receiving section that receives a print job including image data and job setting data; a control section that parses the print job inputted by the receiving section from an external section and controls the image forming section to implement the image forming operation based on the job setting data. Herein, the control section separates a separately-setup character string, which represents a specific setting being different from an original setting established for the setting item included in the job setting data, from a setting character string currently set in the setting item, and handles the job setting data so that the job setting data includes both the setting item represented by the separately-setup character string and the setting character string, so as to control the image forming section to implement the image forming operation and the paper sheet processing section to implement the paper sheet processing, based on the job setting data concerned.

21 Claims, 8 Drawing Sheets

(56) References Cited

U.S. PATENT DOCUMENTS

2011/0051174 A1* 3/2011 Hattori .................. G06F 3/1204
358/1.15
2015/0169256 A1* 6/2015 Fujisawa ................. G06F 3/122
358/1.13

FOREIGN PATENT DOCUMENTS

JP 2008-065467 A 3/2008
JP 2009-160820 A 7/2009

OTHER PUBLICATIONS

Patent Abstracts of Japan, Publication No. 2007-114688 dated May 10, 2007 (1 page).
Patent Abstracts of Japan, Publication No. 2007-140786 dated Jun. 7, 2007 (1 page).
Office Action issued in corresponding Japanese Patent Application No. 2013-076879 dated Feb. 17, 2015 (6 pages).

* cited by examiner

FIG. 5

| SEPARATELY-SETUP CHARACTER STRING | PROCESSING FUNCTION SETTING |
|---|---|
| Sta1 | STAPLE 1 POINT |
| Sta2 | STAPLE 2 POINT |
| Trifold | TRI FOLD PROCESSING |
| Twofold | TWO FOLD PROCESSING |
| Booklet | SADDLE-STITCH BOOKBINDING |
| Coverbook | PASTING BOOKBINDING |
| Squareback | SQUAREBACK PROCESSING |
| Cut | CUT PROCESSING |
| DISTINGUISHING RULE IN SUCH A MANNER THAT THE INITIAL CHARACTER OF THE COLOR NAME OR THE SEPARATELY-SETUP CHARACTER STRING SHOULD BE A CAPITAL LETTER, AND THE SECOND OR LATER CHARACTER THEREOF SHOULD BE A LOWER-CASE LETTER. ||

FIG. 6

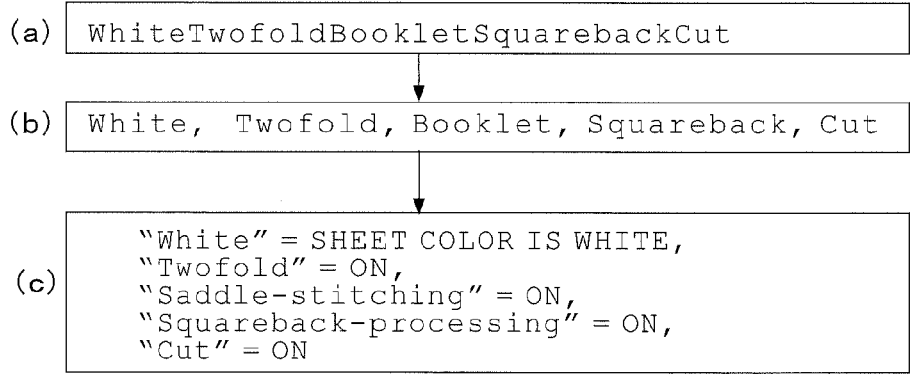

IMAGE FORMING APPARATUS, IMAGE FORMING CONTROL APPARATUS, IMAGE FORMING SYSTEM AND IMAGE FORMING CONTROL PROGRAM

This application claims priority under 35 U.S.C. §119 to Japanese Patent Application No. 2013-76879 filed on Apr. 2, 2013, the entire disclosure of which is incorporated herein by reference in its entirety.

BACKGROUND OF THE INVENTION

1. Field of the Invention

The present invention relates to an image forming apparatus, an image forming control apparatus, an image forming system and an image forming control program, and specifically relates to an improvement of a controlling technology to be employed in such a case that a computer issues an instruction for forming an image to an image forming apparatus or an image forming system.

2. Description of Related Art

A combined system, in which a paper sheet processing apparatus is coupled to an image forming apparatus, makes it possible to apply various kinds of paper sheet processing to the paper sheets on which images are already formed (hereinafter, referred to as image-bearing paper sheets or image-formed paper sheets) so as to output them in a book-bound state. In this case, by additionally coupling a new paper sheet processing apparatus, which has a new function, to the same image forming apparatus, it becomes possible to utilize a newly added paper sheet processing in addition to the conventional paper sheet processing.

In this connection, generally speaking, a computer is coupled to the image forming apparatus through a network, a connection cable or the like, so that a print job, including an image forming instruction and image data, is transmitted to the image forming apparatus from the computer concerned.

Further, various kinds of application programs for conducting image forming operations, for instance, an image forming control program, etc., are installed in the computer above-mentioned. Accordingly, the system is so constituted that the user operates the image forming control program currently executed in the computer to designate the paper sheet processing aforementioned, so that the computer outputs the print job, including the paper sheet processing above-designated, the image forming instruction and image data, to the image forming apparatus concerned.

Still further, with respect to the instructions to be issued from the computer and the controlling operations to be conducted in the image forming apparatus as above-mentioned, the related proposals are set forth in the Patent Documents as briefed as follows.

According to the invention recited in Japanese Patent Application Laid-Open Publication 2008-065467, at the initial occasion of the register processing, the user inputs a name of a type of paper sheet (hereinafter, referred to as a paper type name), formed as an arbitrarily arranged character string, and various kinds of attributes in regard to the kind of paper sheet, from the paper-sheet kind setting screen currently called. Successively, when the user issues a request of registration, a presence or absence of duplication between paper type names, which are managed in the paper-sheet managing tables, respectively including the default paper type names and the custom paper type names already set, and the paper type name inputted by the user, is detected by the apparatus side. Then, when detecting a presence of duplication of the paper type name as a result of the checking operation thereof, the apparatus displays an error message onto the operation panel without registering the paper type name, namely, only for the request of registration in which no duplication of the paper type name is detected, the apparatus registers the paper type name inputted by the user, into the paper-sheet managing table concerned. According to the above-mentioned feature, it becomes possible to solve the problem of setting error that may possibly occur in the apparatus side due to the duplication of the paper type name inputted into the apparatus by the user.

Further, according to the invention recited in Japanese Patent Application Laid-Open Publication 2007-114688, the paper sheet attribute storage section stores the paper sheet attribute inputted through the user interface section, therein, and the identifier attaching section automatically attaches an identifier thereto. Successively, at the time when the tray open/close detecting section detects the fact that the identifier of the paper sheet feeding tray is designated by the paper-sheet attribute setting section and the paper sheet feeding tray concerned is closed, the paper-sheet attribute validating section validates the setting of paper sheet attribute, corresponding to the above-designated identifier, as the setting for the paper sheet feeding tray concerned. Accordingly, in the image forming apparatus, it becomes possible to reduce a number of errors to be possibly committed by the user when setting the paper sheet attributes to a value as lower as possible, and it also becomes possible for the user to securely establish the paper sheet attributes even when the paper sheet feeding apparatus has been replaced with a new one. As a result, in the image forming apparatus, it is possible to securely guarantee the consistency between the paper sheet attributes established by the user and those of the paper sheets accommodated in the paper sheet feeding apparatus.

Still further, according to the invention recited in Japanese Patent Application Laid-Open Publication 2007-140786, in order to achieve the function with which the color copier is not provided, the controller apparatus is made to stand between the network to which the client terminal device and the color copier concerned. When receiving a recovery request message sent from the color copier, the concerned controller apparatus determines whether the recovery request message, which is to be sent back to the client terminal device serving as the sender of the print job, should represent the usage of the user paper-sheet name or that of the printer paper-sheet name, and then, transmits the recovery request message above-determined to the client terminal device concerned. According to the above-mentioned feature, in a case where the notification of the recording paper-sheet error is received from the network printer, and then, the recovery request message is transmitted to the client terminal device, it becomes possible to establish the usage of any one of the user recording paper-sheet name and the printer recording paper-sheet name for every kind of the recording paper sheet.

In this connection, in any one of the Patent Documents above-cited, the system is designed to prevent the paper sheets, which are to be employed in the image forming apparatus, from erroneous settings. However, with respect to the setting operation in such a case that a new function is added to the paper sheet processing apparatus or the like, none of the Patent Documents above-cited pays specific attention thereto.

Owing to the above-mentioned fact, in a case where an image forming control program, which does not support the new function, is employed, it is impossible to establish the new function. However, the latest version of the image forming control program, which fully supports the functions of the paper sheet processing apparatus, is not necessary installed into the computer side.

Concretely speaking, even though the paper sheet processing apparatus, having a new function, is coupled to the image forming apparatus, it is impossible to establish the new function due to a lack of items corresponding to the new function (such as a tub and/or an icon for setting the new function from the setting screen, or a setting screen for the new function itself), as far as an updated image forming control program, which can support the new function, is reinstalled into the computer side.

The present invention is achieved in view of the above-mentioned subjects, and one of the objects of the present invention is to provide an image forming apparatus, an image forming control apparatus, an image forming system and an image forming control program, each of which makes it possible to cope with an operation for setting an image forming operation and/or the paper sheet processing, which is not supported by an image forming control program currently installed into an external computer that transmits a print job including the image forming instructions and image data, to the image forming apparatus concerned.

SUMMARY OF THE INVENTION

According to an image forming apparatus reflecting an aspect of the present invention, the image forming apparatus comprises: a receiving section that receives a print job including image data and job setting data; an image forming section that forms an image onto a paper sheet based on the image data; and a control section that parses the print job inputted by the receiving section from an external section, and controls the image forming section so as to make the image forming section implement an image forming operation based on the job setting data; wherein the control section separates a separately-setup character string from a setting character string currently set in a setting item included in the job setting data, and the separately-setup character string represents a specific setting being different from an original setting established for the setting item; and wherein the control section handles the job setting data so that the job setting data includes both a setting item represented by the separately-setup character string and the setting character string, so as to control the image forming section to implement the image forming operation based on the job setting data.

In this connection, it is desirable that a paper sheet processing apparatus is coupled to the image forming apparatus; and the control section applies the separately-setup character string to a paper sheet processing to be implemented in the paper sheet processing apparatus Further, it is desirable that, with respect to the image forming operation or the paper sheet processing, the control section establishes the separately-setup character string at such an item or a value that cannot be established in an external apparatus, which creates the print job.

Still further, it is desirable that, focusing onto a specific character string established in advance, among the setting character strings, the control section recognizes a delimiter between an original character string and the separately-setup character string.

Still further, it is desirable that, in a case where a value of another setting item included in the job setting data is a specific value established in advance, the control section determines that the separately-setup character string exists.

Yet further, it is desirable that, referring to a table provided in advance, the control section converts the separately-setup character string to a setting contents represented by the separately-setup character string concerned.

BRIEF DESCRIPTION OF THE DRAWINGS

FIG. 5 is an explanatory schematic diagram showing a control table to be displayed on a display section provided in an image forming system in accordance with an embodiment of the present invention.

FIG. 6 is an explanatory schematic diagram indicating a controlling status of an image forming system in accordance with an embodiment of the present invention.

DETAILED DESCRIPTION OF THE PREFERRED EMBODIMENT

Figure 1:
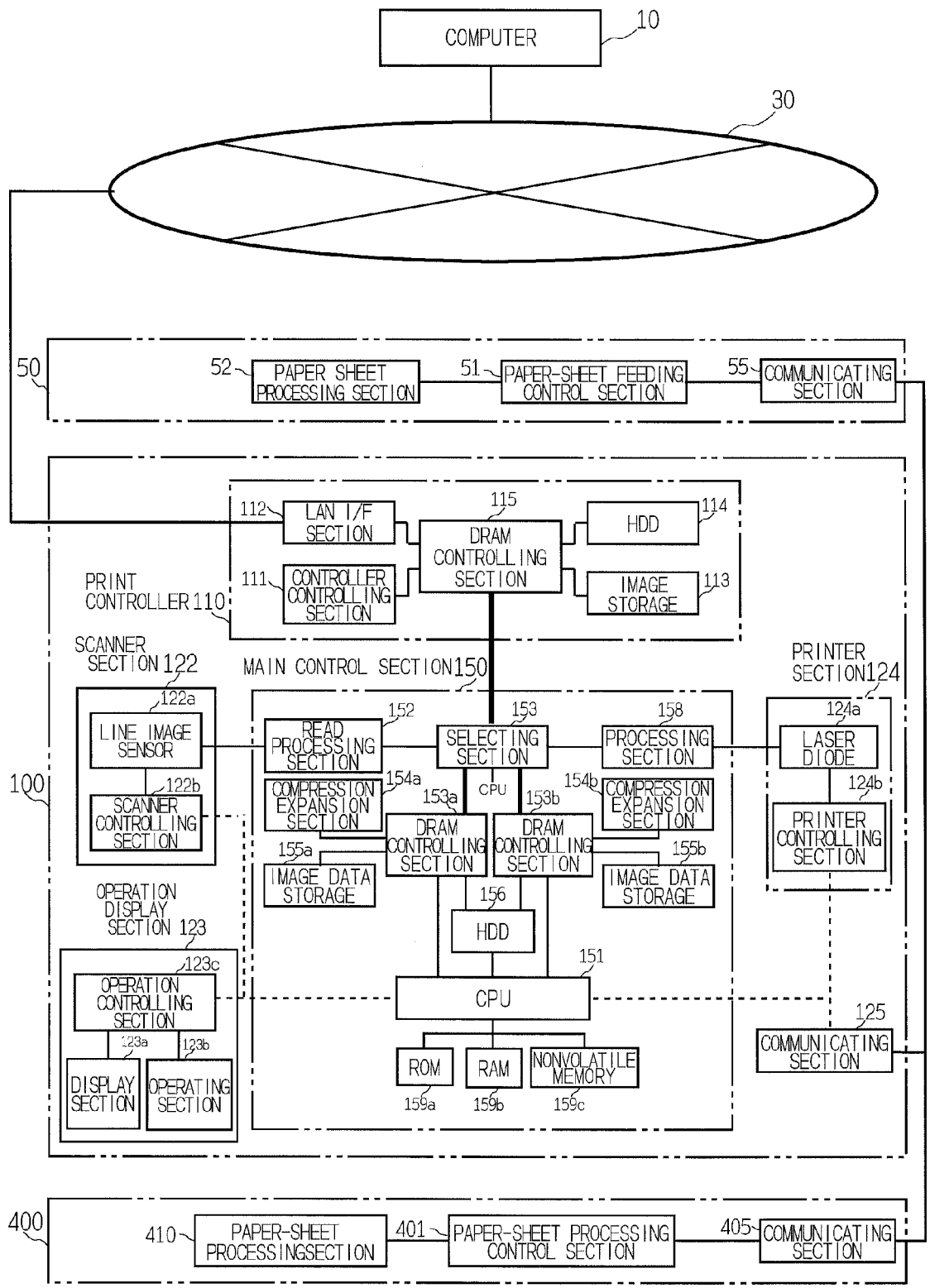
FIG. 1 is a block diagram showing an overall configuration of an image forming system in accordance with an embodiment of the present invention.

In the following paragraphs, one or more embodiments of the invention will be described by way of example and not limitation. It should be understood based on this disclosure that various other modifications can be made by those in the art based on these illustrated embodiments. Referring to the drawings, an embodiment in regard to an image forming apparatus, an image forming control apparatus, an image forming system and an image forming control program, each of which is in accordance with the embodiment of the present invention, will be detailed in the following.

<Configuration of Image Forming System>

FIG. 1 is a block diagram showing relationships between the image forming system in accordance with the embodiment of the present invention and external apparatuses serving as peripheral devices thereof In this connection, a computer 10 serves as an external apparatus that executes an image forming control program to create a print job including image data and job setting data, and transmits the print job above-created to an image forming apparatus 100 through network 30. In this connection, the image forming control program stored in a nonvolatile storage is read therefrom, and installed into the computer 10.

Figure 2:
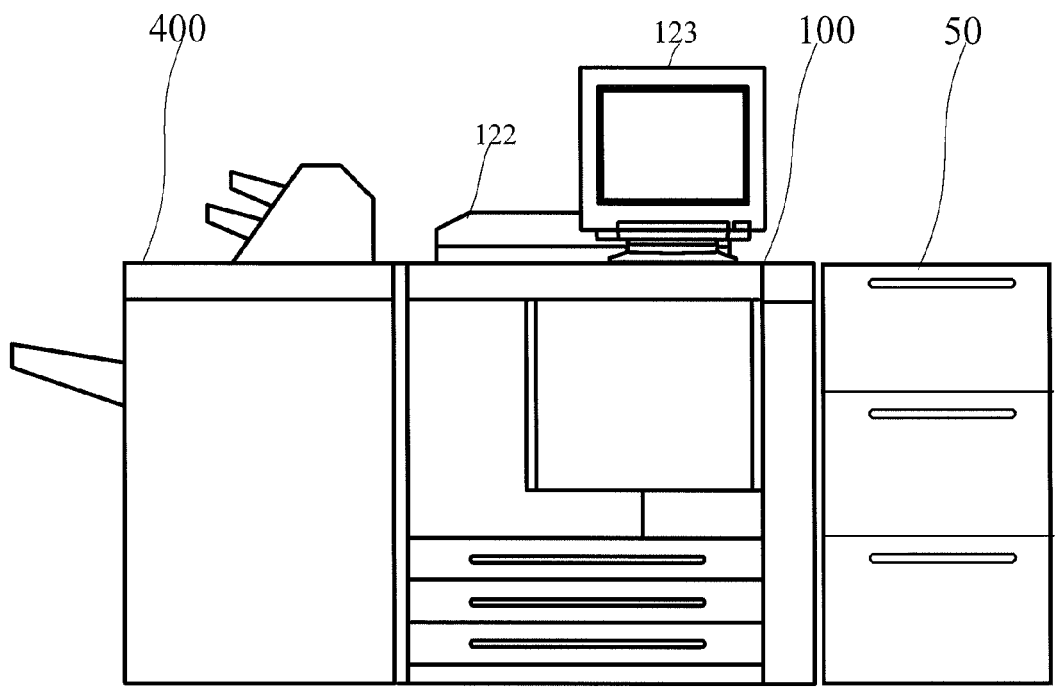
FIG. 2 is a schematic diagram showing an outer appearance of an apparatus arrangement of an image forming system in accordance with an embodiment of the present invention.

As shown in FIG. 2, the image forming system is configured in such a manner that a paper sheet feeding apparatus 50 that feeds a recording paper sheet to be employed for the image forming operation, the image forming apparatus 100 that forms an image onto the recording paper sheet, a paper sheet processing apparatus 400 that applies at least one of various kinds of paper sheet processing (including a fold processing, a punch processing, a staple processing, a book-binding processing, etc.) are arranged and connected in serial along the processing flow of the paper sheet from the right side to the left side in the schematic diagram shown in FIG. 2. Further, the paper sheet feeding apparatus 50, the image forming apparatus 100 and the paper sheet processing apparatus 400 are so constituted that a paper-sheet feeding control section 51, a main control section 150 and a paper-sheet processing control section 401 communicates with each other through communicating sections 55, 125 and 405, respectively, so as to achieve combined (cooperative) controlling operations therebetween.

<Detailed Configuration of Each of Sections Included in Image Forming system>

The block diagram shown in FIG. 1 is indicated by placing the configuration of the image forming apparatus 100, which serves as a main part of the image forming system in accordance with the embodiment of the present invention, at the center area thereof.

The paper sheet feeding apparatus 50 is provided with a paper-sheet feeding control section 51, a paper sheet processing section 52 and the communicating section 55. The paper-sheet feeding control section 51 controls various kinds of sections included therein. The paper-sheet feeding control section 51 controls the paper sheet processing section 52 so as to feed a paper sheet from the tray designated. The communicating section 55 has a function for communicating with the image forming apparatus 100.

The image forming apparatus 100 is provided with a print controller 110, a scanner section 122, an operation display section 123, a printer section 124, the communicating section 125 and the main control section 150, as a rough configuration thereof The print controller 110 is coupled to the computer 10 through a network 30 such as a LAN (Local Area Network), etc., so as to implement a processing for creating image data by applying a rasterizing processing to a print job transmitted from the computer 10 (RIP (Raster Image Processor) processing). In this connection, the image data concerned is created in the bit-map format to be directly utilized for the image forming operation.

The print job, received from the computer 10 by the print controller 110, includes print data representing characters and figures by using code data and/or vector data, for instance, print data written by the PDL (Page Description Language). The RIP processing is defined as such a processing for developing print data, which is constituted by code data and/or vector data, into image data written in the bit-map format.

The print controller 110 is provided with a controller controlling section 111, a LAN (Local Area Network) interface section 112, an image storage 113, an HDD (Hard Disc Drive) 114 and a DRAM (Dynamic Random Access Memory) controlling section 115. The controller controlling section 111 is provided with a CPU (Central Processing Unit) to control overall operations to be performed by the print controller 110 concerned. The LAN interface section 112 has a communicating function for coupling the print controller 110 to the network 30. The image storage 113 stores image data created by applying the RIP processing to the print data, etc., therein. The HDD 114 accumulates print data received through the network 30 and intermediate data created in midcourse of implementing the RIP processing, therein. The DRAM controlling section 115 has a read/write function for reading and writing data from/into the image storage 113 and another function for bilaterally transmitting and receiving various kinds of data to/from the main control section 150.

In addition, with respect to print jobs received from computer 10, the print controller 110 applies the RIP processing to such a print job that is to be immediately employed for the image forming operation, and then, transmits the created image data to the main control section 150, while, the print controller 110 stores such another print job that is to be employed for the image forming operation later on, into the HDD 114.

In this connection, although the block diagram shown in FIG. 1 indicates such a state that the print controller 110 is incorporated into the image forming apparatus 100 inside, it may be also possible to install the print controller 110 at a position outside the image forming apparatus 100.

Other than the above-mentioned, a ROM (Read Only Memory) that stores various kinds of programs and fixed data, which are to be read and executed by the controller controlling section 111, and a working memory that temporarily stores various kinds of data during the time when the controller controlling section 111 executes the programs, are coupled to the controller controlling section 111, though both of them are omitted from the block diagram shown in FIG. 1.

The scanner section 122 optically reads a document in either a color reading mode or a monochrome reading mode to acquire image data of the document, and is provided with a line image sensor 122a and a scanner controlling section 122b for controlling overall operations to be performed by the scanner section 122

The operation display section 123 has a function for displaying various kinds of setting screens, operating screens, etc., another function for displaying various kinds of guidance information, notifications, warning messages, etc., directing to the operator, and still another function for accepting various kinds of setting and selecting operations, editing operations and an output instruction (instruction of commencing an image forming operation), which are inputted by the operator. The operation display section 123 is constituted by: a display section 123a including an LCD (Liquid Crystal Display); an operating section 123b including touch switches mounted over the screen thereof and other switches; and an operation controlling section 123c that controls the display section 123a and the operating section 123b.

The printer section 124 is provided with LDs (Laser Diode) 124a, each of which is modulated in the ON/OFF modulation mode in response to image data corresponding to each of primary colors, and a printer controlling section 124b that controls operations to be performed by a process unit, etc.

In this connection, each of the scanner controlling section 122b, the operation controlling section 123c and the printer controlling section 124b is constituted by an electronic circuit in which a CPU (Central Processing Unit), a ROM (Read Only Memory), a RAM (Random Access Memory), etc. serve as main parts thereof, and implements various kinds of controlling operations by executing various kinds of programs stored in the ROM.

The main control section 150 controls overall operations of the image forming apparatus 100 in conjunction with the control sections respectively provided in various kinds of operating sections, and is constituted by a CPU 151, a read processing section 152, a selecting section 153, a DRAM controlling section 153*a* (DRAM controlling section (1)), a DRAM controlling section 153*b* (DRAM controlling section (2)), a compression expansion section 154*a* (compression expansion section (1)), a compression expansion section 154*b* (compression expansion section (2)), an image data storage 155*a* constituted by a semiconductor memory device (image data storage (1)), an image data storage 155*b* constituted by a semiconductor memory device (image data storage (2)), an HDD (Hard Disc Drive) 156, a write processing section 158, a ROM 159*a*, a RAM 159*b* and a nonvolatile data storage 159*c*.

In addition to the controlling function for controlling overall operations in regard to an image forming operation, the CPU 151 separates a separately-setup character string, which represents a specific setting being different from an original setting established for the setting item from a setting character string currently set in a setting item included in the job setting data. Then, the CPU 151 handles the job setting data so that the job setting data includes both a setting item represented by the separately-setup character string and the setting character string, so as to control the image forming section to implement the image forming operation based on the job setting data.

The ROM 159*a* stores various kinds of programs, fixed data, etc., so that the CPU 151 conducts various kinds of operations by executing the programs stored in the ROM 159*a*. The RAM 159*b* serves as a working memory in which various kinds of data are temporarily stored during the time when the CPU 151 executes the programs. The nonvolatile data storage 159*c* stores user data, system data, various kinds of setting values, which should be stored therein even after the electric power supply has been turned OFF.

The read processing section 152 applies various kinds of processing, such as an image enlargement processing, a mirror image processing, an error diffusion processing, etc., to the image data outputted by the scanner section 122. Further, the selecting section 153 selects any one of the DRAM controlling section 153*a* and the DRAM controlling section 153*b*, based on the instruction issued by the CPU 151.

The DRAM controlling section 153*a* conducts operations for controlling timings of reading, writing and refreshing operations to be implemented in the image data storage 155*a* constituted by a Dynamic Random Access Memory, applies compression processing to the image data so as to store the compressed image data into the image data storage 155*a*, conducts timing controlling operations to be implemented at the time when the compressed image data is read out from the image data storage 155*a* to apply the expansion processing thereto, and conducts other operations.

The DRAM controlling section 153*b* conducts operations for controlling timings of reading, writing and refreshing operations to be implemented in the image data storage 155*a* constituted by a Dynamic Random Access Memory, applies compression processing to the image data so as to store the compressed image data into the image data storage 155*b*, conducts timing controlling operations to be implemented at the time when the compressed image data is read out from the image data storage 155*b* to apply the expansion processing thereto, and conducts other operations.

Further, the DRAM controlling section 153*a* and the DRAM controlling section 153*b* are coupled to the DRAM controlling section 115 of the print controller 110 through the selecting section 153 and the PCI (Peripheral Component Interconnect) bus, so as to make it possible to bilaterally transmit and receive various kinds of data to/from the print controller 110.

By utilizing the image data storage 155*a* as the storage area, the compression expansion section 154*a* applies the compression processing to image data so as to create compressed image data, and then, applies the expansion processing to the compressed image data so as to restore the compressed image data to the original image data, in order to implement the compression processing function and the expansion processing function. Further, by utilizing the image data storage 155*b* as the storage area, the compression expansion section 154*b* applies the compression processing to image data so as to create compressed image data, and then, applies the expansion processing to the compressed image data so as to restore the compressed image data to the original image data, in order to achieve (implement) the compression processing function and the expansion processing function.

The image data storage 155*a* is utilized by the compression expansion section 154*a*, and stores the compressed image data, created by applying the compression processing, and the image data restored by applying the expansion processing to the compressed image data. Further, the image data storage 155*b* is utilized by the compression expansion section 154*b* and stores the compressed image data, created by applying the compression processing, and the image data restored by applying the expansion processing to the compressed image data.

The HDD 156 stores and saves data included in the print job received from the print controller 110 (job data), etc., therein. In response to image data acquired by applying the expansion processing to the compressed image data read from the image data storage 155*a* or the image data storage 155*b*, the write processing section 158 outputs signals that make the LD 124*a*, corresponding to each of the primary colors, turn ON or OFF, at the timings in conformity with the operations to be performed in the printer section 124.

The paper sheet processing apparatus 400 is constituted by a paper-sheet processing control section 401, a paper sheet processing section 410 and the communicating section 405. The paper-sheet processing control section 401 controls various kinds of sections provided in the paper sheet processing apparatus 400. The paper sheet processing section 410 is controlled by the paper-sheet processing control section 401, in order to implement various kinds of paper sheet processing. The communicating section 405 has a function for communicating with the image forming apparatus 100.

<Preconditions>

The image forming control program installed in the computer 10 is in conformity with various kinds of functions and setting operations, which are provided and conducted in either the image forming apparatus 100 itself or the image forming system including the image forming apparatus 100 and the paper sheet processing apparatus 400, and is to be executed for creating a print job under the instructing operations conducted by the user. In this connection, in the image forming system, it is possible to couple a new model of the paper sheet processing apparatus 400, having interchangeability, to the image forming apparatus 100. Accordingly, hereinafter, the present embodiment is established on the premise that a new function or a new setting, which is not supported by the image forming control program currently installed in the computer 10, exists in either the image forming apparatus 100 side or the paper sheet processing apparatus 400 side.

In other words, in the present embodiment herein, it is assumed such a case that the image forming control program currently installed in the computer 10 does not necessary support all of the functions and the settings provided in the image forming apparatus 100 and the paper sheet processing apparatus 400. In this connection, the above-expression of "the image forming control program does not necessary support" means such a state that, with respect to a certain function or setting, no setting item exist at the image forming control program side, or another state that, even though a setting item exist at the image forming control program side, no option for selecting a setting value exists, or still another state that, even though a setting item exist at the image forming control program side, it is impossible to input a setting value due to the fact that the setting value becomes out of the range, or a similar state.

Further, with respect to the function and the settings, which are not supported by the image forming control program, the present embodiment makes it possible to input the separately-setup character string, which represents a specific setting being different from an original setting established for the setting item, into the concerned setting item, which already exists and has a freedom degree of inputting operation (hereinafter, referred to as an inputting flexibility). In this connection, the expression of "has an inputting flexibility" is defined as such a state that a separately-setup character string, which is different from an originally setup character string, is inputtable, for instance, not only numerical characters 0-9 but also alphabetical characters a-z, symbols, etc. are inputtable, and, some room still remains for a number of inputting characters being inputtable, etc.

Concretely speaking, in recent years, as for the paper sheet color, there has been increasingly employed a wide variety of paper sheet colors, and there also exists a user-defined color. Further, in order to securely define the paper sheet color by using the user-defined color, sometimes, in case of "paper sheet color=user-defined", it may be possible to input an arbitrary color name. In this case as above-mentioned, it is established that a separately-setup character string, which represents a specific setting being different from the originally-established setting (arbitrary color name), is inputted into the setting item of the arbitrary color name In this connection, it is also possible to input the separately-setup character string into another item.

Then, for instance, with respect to functions and settings, which are not supported by the image forming control program among those provided in the image forming apparatus 100 and the paper sheet processing apparatus 400, various kinds of the separately-setup character strings in regard to the staple processing, the fold processing, the bookbinding processing, etc., are established in advance as indicated in the correspondence table shown in FIG. 5. In this connection, the correspondence table concerned may be defined as the conversion table or the like, which is to be stored into the nonvolatile data storage 159c, etc. Since the separately-setup character string is converted to the setting contents represented by the separately-setup character string concerned by using the correspondence table as above-mentioned, the separately-setup character string can be correctly converted to the setting contents originally meant, and accordingly, it becomes possible to securely cope with the settings of the image forming operation and the paper sheet processing, which are not supported by the image forming control program currently installed in the computer 10 provided in the external environment.

In this connection, hereinafter, other than the functions, which are not supported by the image forming control program but are provided in the image forming apparatus 100 and the paper sheet processing apparatus 400, such values and items that fall into a range in which it is impossible to establish them as setting values, but are supported by the image forming control program, are also defined as the settings which are not supported by the image forming control program.

Further, the identifier and the distinguishing rule, which are to be employed on an occasion of recognizing the difference between the arbitrary color names originally established and the separately-setup character string, and categorizing them into each other, are established at the same time. For instance, it is possible to form the identifier as a character string unused in a normal setting, such as an underscore "-", a hyphen "-", a comma ",", etc. Further, it is possible to establish the distinguishing rule in such a manner that the initial character of the color name or the separately-setup character string should be a capital letter, and the second or later character thereof should be a lower-case letter. According to the above-mentioned, it becomes possible to separate the separately-setup character string from the originally-established settings without committing any error.

Still further, in regard to the setting item in which a numerical value is to be inputted, it is also possible to allot a specific numerical value among numerical values unused in a normal situation as the separately-setup character string. However, it may be necessary to devise a certain counter-measure to prevent the numerical value erroneously inputted as that to be inputted in the normal situation from being handled as the separately-setup character string.

In this connection, it is desirable that a state (separately-setup character string existing criterion), which represents the fact that the paper sheet processing designation, included in the job setting data, includes the separately-setup character string, is also established in advance. For instance, established in advance is such a criterion (separately-setup character string existing criterion) that, only in a case where PAPER SHEET SIZE="AUTOMATIC" and BASIS WEIGHT OF PAPER SHEET="AUTOMATIC" are established, the separately-setup character string is included in the arbitrary color names. According to the above-mentioned, it becomes possible to separate the separately-setup character string therefrom without committing any error.

<Operation (1)>

Next, referring to the flowchart shown in FIG. 3, the image forming control operations to be implemented by the image forming apparatus, the image forming control apparatus and an image forming control program, and the image forming operations and the paper sheet processing operations to be performed in the image forming system, each of which is in accordance with the embodiment of the present invention, will be detailed in the following.

Incidentally, in the following descriptions of the embodiment of the present invention, there will be described such the controlling operations to be conducted by the main control section 150, that includes: separating a separately-setup character string, which represents a specific setting being different from an original setting established for the setting item, from a setting character string currently set in a setting item included in the job setting data; and handling the job setting data so that the job setting data includes both a setting item represented by the separately-setup character string and the setting character string.

Initially, a person who intend to conduct an image forming operation and/or the paper sheet processing (hereinafter, referred to as a user) makes the computer 10 execute the image forming control program currently installed therein, so as to conduct an operation for inputting the image forming instruction in regard to what kind of paper sheet and what kind of image data should be employed for the image forming operation, and another operation for inputting the paper-sheet processing instruction in regard to what kind of paper sheet processing (such as a fold processing, a punch processing, a staple processing, a bookbinding processing, etc.) should be applied to the image-formed paper sheet. In this connection, the image forming instruction and the paper-sheet processing instruction are included in the job setting data, while the job setting data and the image data are included in the print job.

Figure 4:
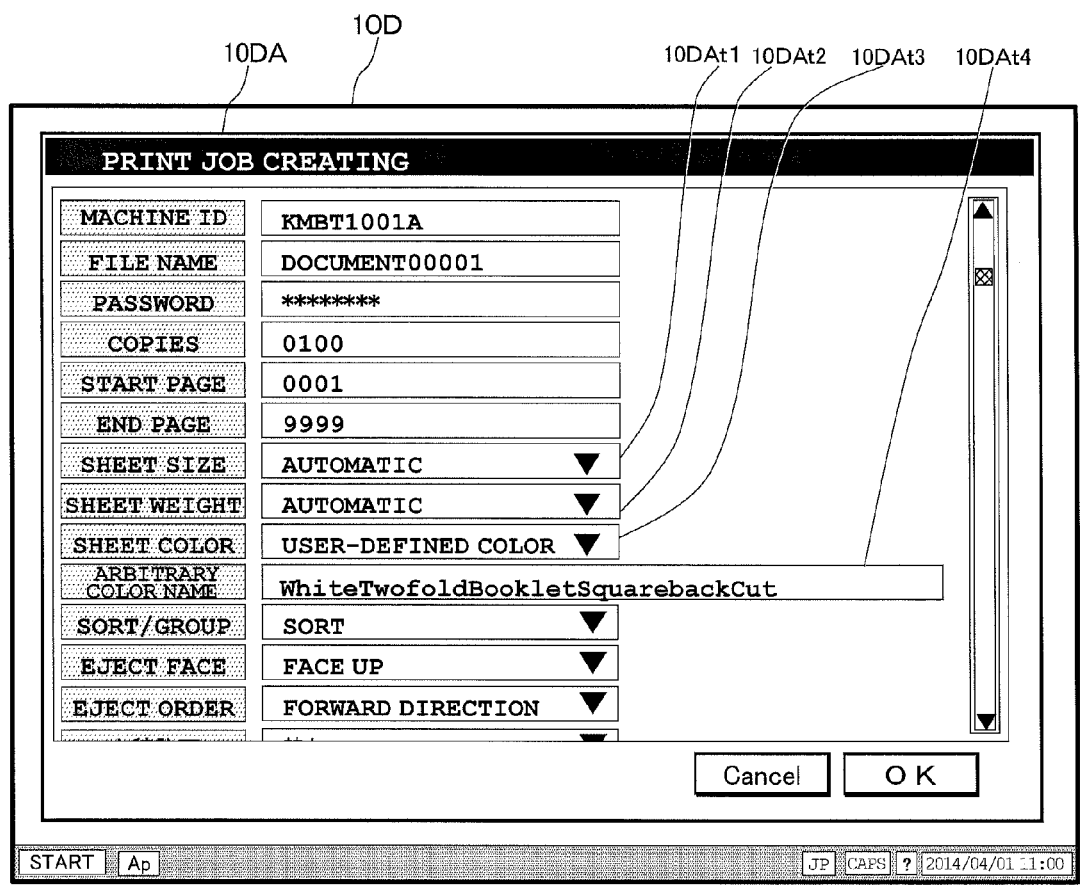
FIG. 4 is an explanatory schematic diagram showing an exemplified screen to be displayed on a display section provided in an image forming system in accordance with an embodiment of the present invention.

FIG. 4 is a schematic diagram showing a print job creating screen 10DA of the image forming control program, which is to be displayed on a display section 10D of the computer 10. The user inputs the image forming instruction in regard to which file should be employed for the image forming operation or the like, from the print job creating screen 10DA above-mentioned. According to the descriptions indicated in the schematic diagram shown in FIG. 4, there is exemplified such a state that the image forming instruction for forming images stored in the file having a file name of "DOCUMENT00001" from the first page to the final page until 100 copies thereof are formed, is inputted into the image forming apparatus having a code name of "KMBT1001A".

Further, the print job creating screen 10DA shown in FIG. 4 exemplifies such a state that the paper sheet processing instructions, including PAPER SHEET SIZE="AUTOMATIC"(refer to 10DAt1, shown in FIG. 4), BASIS WEIGHT OF PAPER SHEET="AUTOMATIC"(refer to 10DAt2, shown in FIG. 4), PAPER SHEET COLOR="USER-DEFINED COLOR"(refer 10DAt3, shown in FIG. 4), ARBITRARY COLOR NAME OF PAPER SHEET COLOR="WhiteTwofoldBookletSquarebackCut"(refer to 10DAt4, shown in FIG. 4), SORT/GROUP="SORT" and PAPER SHEET EJECTING ORDER="FORWARD DIRECTION", are inputted. In this connection, although the contents of the arbitrary color name of the paper sheet color will be detailed later on, in regard to the function or the setting, which is not supported by the image forming control program, the user inputs them according to the correspondence table shown in FIG. 5 in such a state that the user makes the separately-setup character string to be included therein.

Still further, the image forming control program handles both the image forming instruction and the paper sheet processing instruction, above-mentioned, as the job setting data. Further, the image data is written as code data, vector data or written in Page Description Language, by the image forming control program. Then, the job setting data and the image data are transmitted to the image forming apparatus 100 by executing the image forming control program.

Figure 3:
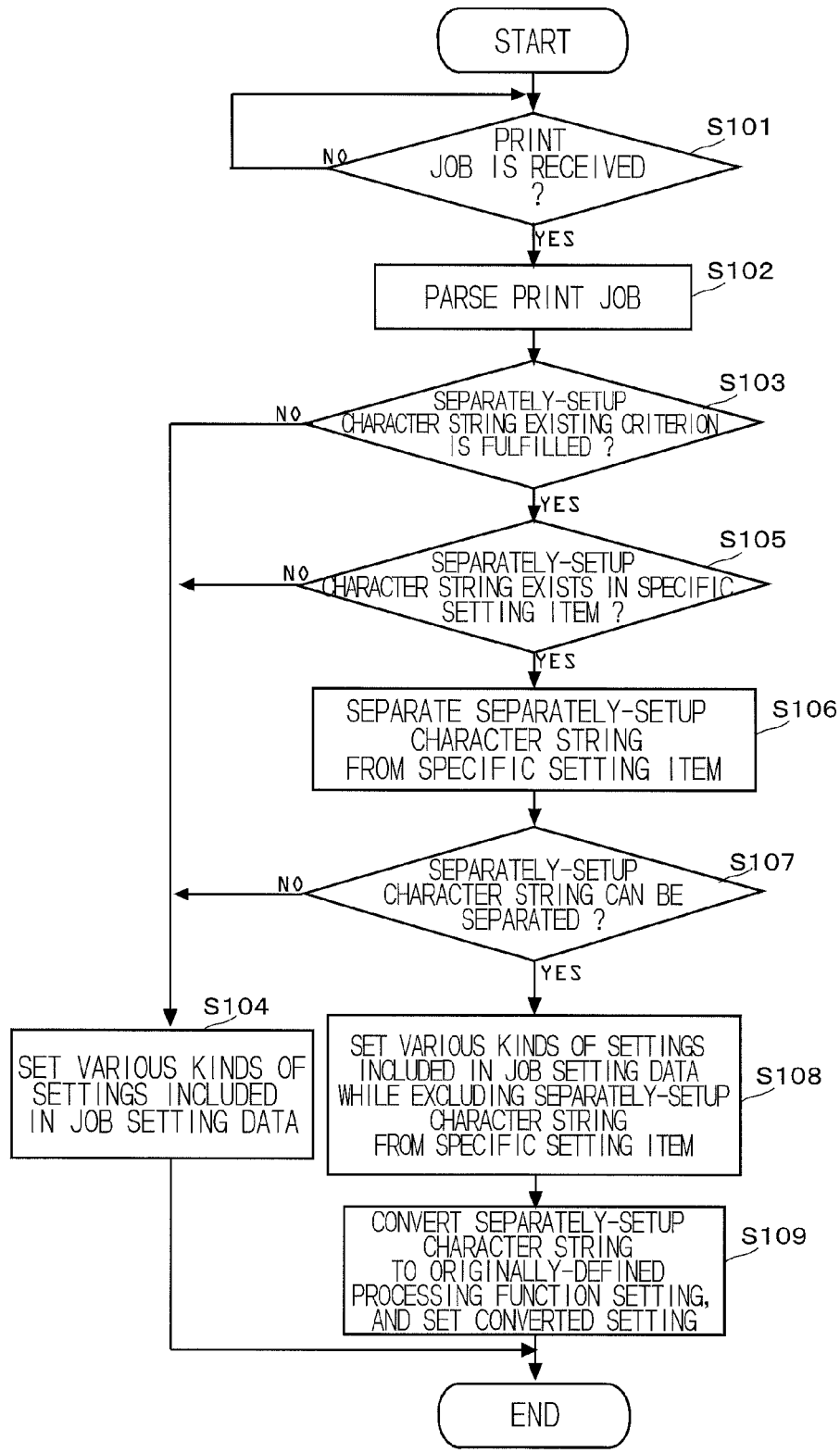
FIG. 3 is a flowchart indicating a flow of operations to be conducted in an image forming system in accordance with an embodiment of the present invention.

The image forming apparatus 100 employs the image forming control program to receive the print job created by the computer 10 through the network 30 (Step S101, shown in FIG. 3).

The print controller 110 provided in the image forming apparatus 100 conducts the rasterize processing by applying the RIP processing to the code data, the vector data and the image data written in a language so as to convert them to the converted image data represented in the bit-map format.

Receiving the print job sent from the print controller 110, the CPU 151 provided in the main control section 150 determines whether or not the designation of paper sheet processing, included in the job setting data, fulfills the state (separately-setup character string existing criterion) that indicates the inclusion of the separately-setup character string (Steps S102 and S103, shown in FIG. 3). For instance, in a case where it is established as the separately-setup character string existing criterion that, when PAPER SHEET SIZE="AUTOMATIC" and BASIS WEIGHT OF PAPER SHEET="AUTOMATIC" are established, the arbitrary color name includes the separately-setup character string, the CPU 151 determines whether or not PAPER SHEET SIZE="AUTOMATIC" and BASIS WEIGHT OF PAPER SHEET="AUTOMATIC" are established as the designation of the paper sheet processing, included in the job setting data.

In this connection, when determining that the designation of the paper sheet processing, included in the job setting data, does not fulfill the separately-setup character string existing criterion (Step S103; NO, shown in FIG. 3), due to the non-existence of the separately-setup character string, the CPU 151 sets the various kinds of settings included in the job setting data as it is (Step S104, shown in FIG. 3).

On the other hand, when determining that the designation of the paper sheet processing, included in the job setting data, fulfills the separately-setup character string existing criterion (Step S103; YES, shown in FIG. 3), based on the identifier and the distinguishing rule, the CPU 151 conducts processing for recognizing the function and the setting value (for instance, an arbitrary color name), originally established, and the separately-setup character string, respectively, so as to separate them form each other, in regard to the character string established for the specific setting item (for instance, the item of an arbitrary color name of the paper sheet color) (Steps S105 and S106, shown in FIG. 3).

When determining that the separately-setup character string does not exist as a result of the above-mentioned determinations based on the identifier and the distinguishing rule (Step S105; NO, shown in FIG. 3), or when determining that, although the separately-setup character string exists as a result of the above-mentioned determinations based on the identifier and the distinguishing rule (Step S105; YES, shown in FIG. 3), it is impossible to separate the separately-setup character string even by employing the separation processing based on the identifier and the distinguishing rule aforementioned (Step S107; NO, shown in FIG. 3), the CPU 151 sets the various kinds of settings included in the job setting data as it is (Step S104, shown in FIG. 3).

When determining that the separately-setup character string exists as a result of the above-mentioned determinations based on the identifier and the distinguishing rule (Step S105; YES, shown in FIG. 3), and the separately-setup character string can be separated therefrom by employing the separation processing based on the identifier and the distinguishing rule aforementioned (Step S107; YES, shown in FIG. 3), the CPU 151 sets the various kinds of settings included in the job setting data in such a state that the separately-setup character string is excluded from the specific setting item (Step S108, shown in FIG. 3). In this connection, the setting item, which has noting to do with the separately-setup character string, is set as it is.

Then, referring to the correspondence table shown in FIG. 5, the CPU 151 converts the separately-setup character string above-separated to the originally-defined processing function setting (function and setting value in the original setting item) to set the converted setting (Step S109, shown in FIG. 3).

In this connection, ARBITRARY COLOR NAME="WhiteTwofoldBookletSquarebackCut", in regard to the paper sheet color indicated in the concrete example shown in FIG. 4, is recognized as "White Twofold Booklet Squareback Cut" by referring to the identifier and the distinguishing rule aforementioned (refer to Lines (a) and (b) shown in FIG. 6). Then, the character string of "WhiteTwofoldBookletSquarebackCut" is divided into the original character string of "White" and the separately-setup character string of "Twofold Booklet Squareback Cut". Finally, the character strings of "Twofold Booklet Squareback Cut" are divided into "White" in regard to the paper sheet color, "Twofold=ON", "Saddle-stitching=ON", "Squarebackprocessing=ON" and "Cut=ON", in regard to the paper sheet processing, so as to set them to the setting items, respectively (refer to Line (c) shown in FIG. 6).

As described in the foregoing, it becomes possible for the image forming apparatus 100 or the paper sheet processing apparatus 400 to cope with the settings for the image forming operation and the paper sheet processing, even though the image forming control program installed in the external computer 10, which transmits the image forming instruction and the image data as the print job, does not support the settings concerned.

FIG. 1 is an exemplary schematic diagram indicating a display screen 123Gm1, which is to be displayed in midcourse of implementing a job ticket edit processing, within a display screen 123G of the display section 123*a* provided in the image forming apparatus 100. The exemplary schematic diagram indicates such a state that, by employing the separately-setup character string aforementioned, the setting functions and the setting values, which are not supported by the image forming control program currently installed in the computer 10, are successfully set into the display screen 123Gm1.

Figure 7:
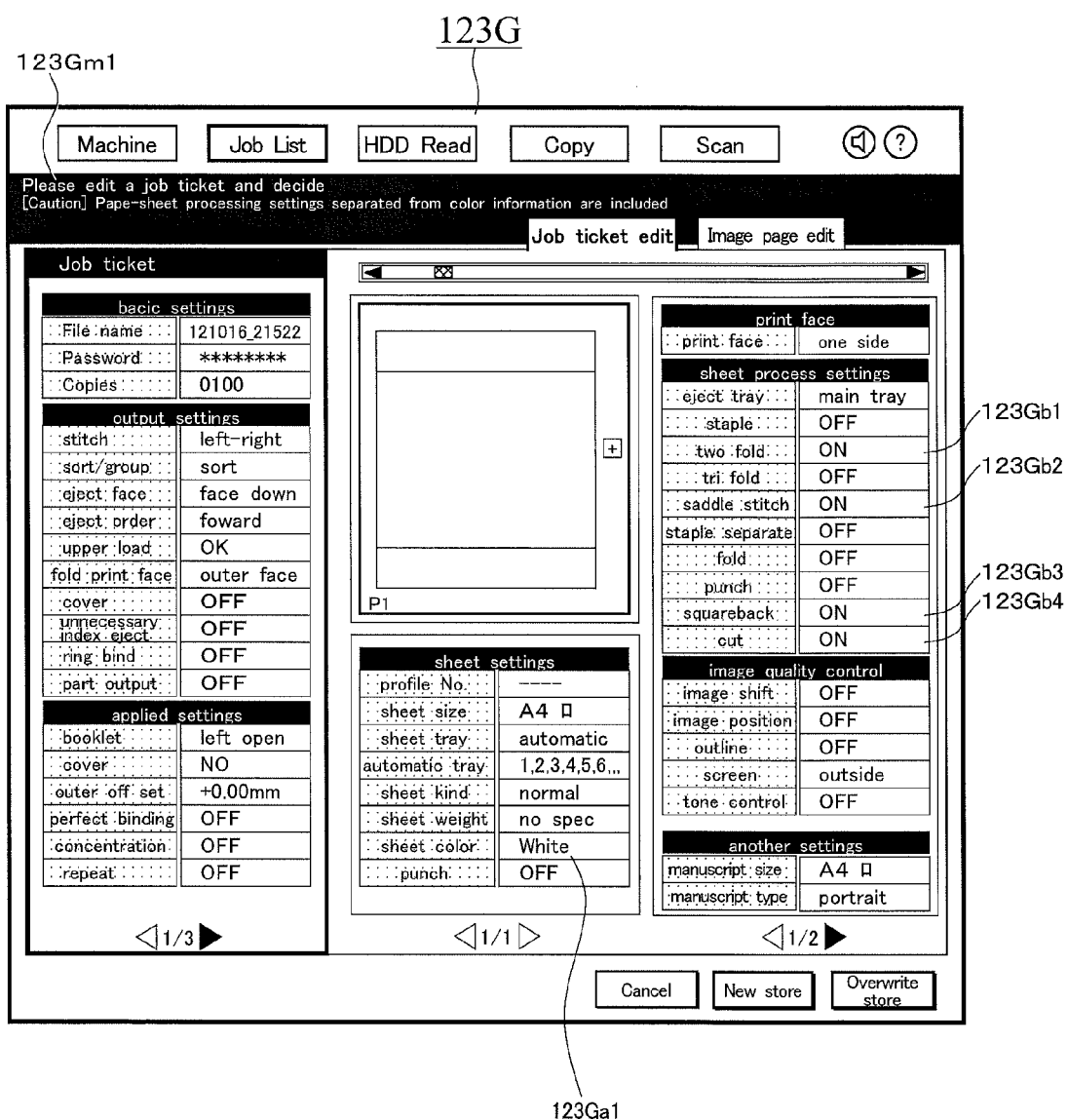
FIG. 7 is an explanatory schematic diagram showing an exemplified screen to be displayed on a display section provided in an image forming system in accordance with an embodiment of the present invention.

Concretely speaking, "Color paper=White" (refer to 123Ga1, shown in FIG. 7) in regard to the paper sheet setting, and "Twofold=ON" (refer to 123Gb1, shown in FIG. 7), "Saddle-stitching=ON" (refer to 123Gb2, shown in FIG. 7), "Squareback-processing=ON" (refer to 123Gb3, shown in FIG. 7) and "Cut=ON" (refer to 123Gb4, shown in FIG. 7), in regard to the paper sheet processing, are set into the display screen 123Gm1.

In this connection, it is applicable that, with respect to the fact that the operation for separating the separately-setup character string has been actually implemented, a message representing "[ATTENTION!] PAPER-SHEET PROCESSING SETTINGS SEPARATED ED FROM COLOR INFORMATION ARE INCLUDED!" or the like is displayed onto the operation display section 123. Alternatively, it is also applicable that the setting items relating to the separately-setup character string are displayed in a different color or in a flashing display mode, so as to invite the user's attention.

Figure 8:
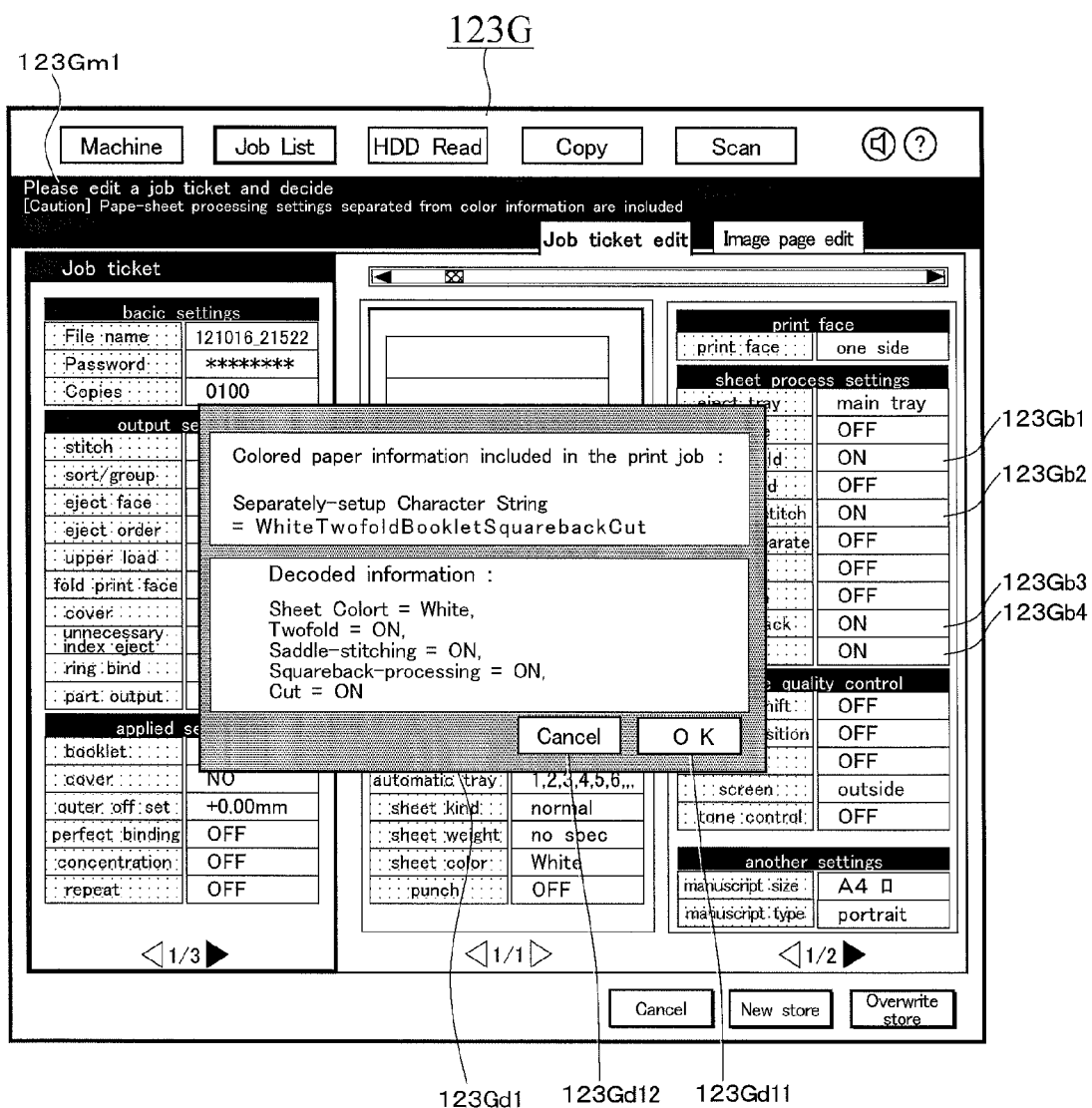
FIG. 8 is an explanatory schematic diagram showing an exemplified screen to be displayed on a display section provided in an image forming system in accordance with an embodiment of the present invention.

Further, it is also applicable that, at the time when separating the separately-setup character string so as to set the separated character strings as aforementioned, both the state before separating the separately-setup character string and the other state after separating the separately-setup character string are displayed as a pop-up screen 123Gd1, in order to invite the user's attention (refer to the schematic diagram shown in FIG. 8).

<Operation (2)>

Figure 9:
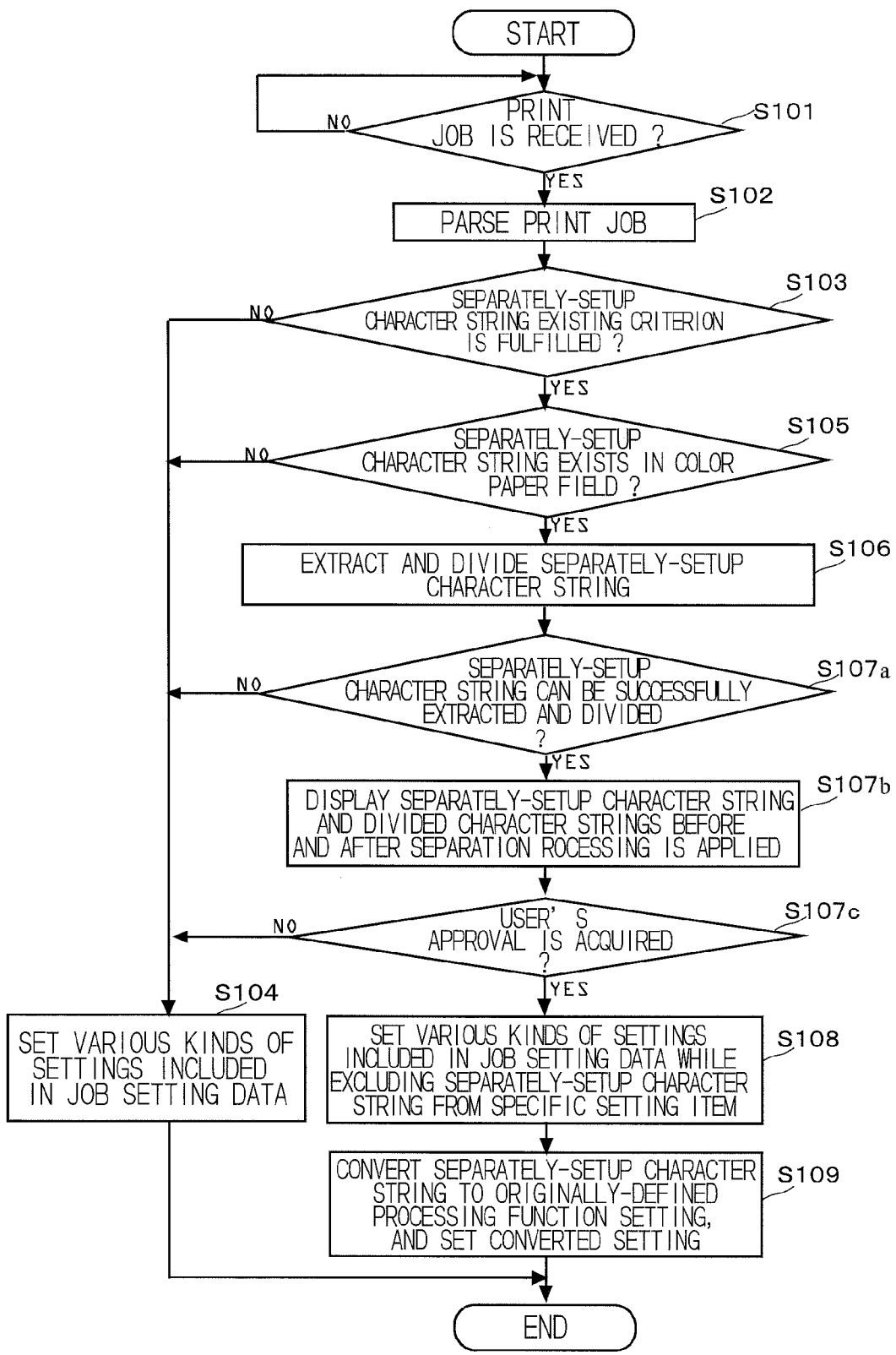
FIG. 9 is a flowchart indicating a flow of operations to be conducted in an image forming system in accordance with an embodiment of the present invention.

Still further, with respect to the pop-up screen 123Gd1 for inviting the user's attention as above-mentioned, the flow of the controlling operations indicated in the flowchart shown in FIG. 9 is also applicable, as described in the following. In this connection, in the flowchart shown in FIG. 9, duplicated explanations will be omitted by attaching the same step number to the processing same as that in the flowchart shown in FIG. 3.

In a case where the separately-setup character string can be successfully divided by applying the separation processing (Step S106, shown in FIG. 9) based on the identifier and the distinguishing rule aforementioned (Step S107*a*; YES, shown in FIG. 9), the CPU 151 conducts the controlling operations as follows. Concretely speaking, the CPU 151 displays both the separately-setup character string and the divided character strings before and after the separation processing is applied, onto the pop-up screen 123Gd1 (Step S107*b*, shown in FIG. 9). Then, when the user's approval is acquired (depressing 123Gd11 shown in FIG. 8, Step S107*c*; YES, shown in FIG. 9), the CPU 151 sets the character string acquired by excluding the separately-setup character string from the specific setting item (Step S108, shown in FIG. 3) and converts the divided character strings separated from the separately-setup character string to the original processing function settings (functions and the setting values in the original setting items) so as to set them therein (Step S109, shown in FIG. 3).

Successively, when the user's approval in regard to the separately-setup character string is not acquired (depressing 123Gd12 shown in FIG. 9, Step S107*c*; NO, shown in FIG. 9), the CPU 151 sets the various kinds of settings, included in the job setting data, as it is (Step S104, shown in FIG. 3).

As described in the above, with respect to the separately-setup character string, by employing the user's approval in addition to displaying the contents thereof, it is possible to correctly determine whether or not the separately-setup character string, intended by the user, is correctly divided by the CPU 151, and whether or not the CPU 151 erroneously determines the user-defined color as the separately-setup character string, and accordingly, it becomes possible to conduct the paper-sheet processing setting without committing any error.

Further, it is also applicable that, in this pop-up screen 123Gd1 as shown in FIG. 8, with respect to the operations for separating the separately-setup character string from the user-defined color and setting the paper-sheet processing setting, another detailed screen is further provided so as to conduct a fine correcting operation and/or a learning activity, thereon.

<Other Embodiments>

In the foregoing, the embodiment of the present invention has been described in association with the concrete examples thereof. However, the scope of the concrete configuration in accordance with the embodiment of the present invention is not limited to the embodiment aforementioned. Modifications and additions, made by a skilled person without departing from the spirit and scope of the invention in regard to the present embodiment, shall be included in the scope of the present invention.

In the foregoing, although the embodiment of the present invention has been described on the premise that the setting operation in the paper sheet processing apparatus 400 is performed by employing the separately-setup character string, the scope of the present invention is not limited to the above-embodiment. With respect to the setting function to be performed in each of the sections provided in the image forming system concerned, it is also possible to establish a function and/or a setting value, which are/is not supported by the image forming control program currently installed.

For instance, with respect to the setting function to be performed in each of the sections, such as the paper-sheet feeding setting function to be performed by the paper sheet feeding apparatus 50, the image processing function to be performed in the image forming apparatus 100, the reading function and the read image processing function to be performed in the scanner section 122, the various kinds of setting functions to be performed by the printer section 124, etc., it is possible to establish a function and/or a setting value, which are/is not supported by the image forming control program currently installed.

Further, in the aforementioned embodiment, although the CPU 151 provided in the main control section 150 conducts the controlling operation for making the separately-setup character string, which represents a specific setting being different from an original setting established for the setting item, separate from the setting character string in the setting item included in the job setting data, and then, conducts the other controlling operation for handling the job setting data so that the job setting data includes both a setting item represented by the separately-setup character string and the setting character string, the scope of the present invention is not limited to the above.

For instance, it is also possible for the print controller 110 to conduct the distinguishing controlling operations abovementioned. In this case, the print controller 110 may configure the image forming control apparatus described in the claimed present invention.

Still further, although, in the aforementioned embodiment, it has been indicated such a state that the print controller 110 is incorporated into the image forming apparatus 100, it is also possible to install the print controller 110 at an external place outside the image forming apparatus 100. In this connection, in a case where the print controller 110 is installed at the external place outside the image forming apparatus 100, operations for transmitting and receiving various kinds of data may be implemented between the print controller 110 and the image forming apparatus 100 through an interface, which is suitable for both of them.

Still further, in a case where a print job, received from the computer 10, is stored into the print controller 110, and after that, is employed for an image forming operation, the operation for processing the separately-setup character string may be implemented at the time of implementing the image forming operation concerned. However, in a case that the print controller 110 is provided with the function for processing the separately-setup character string, the operation for processing the separately-setup character string may be implemented at the time of receiving the print job concerned, or at the time of implementing the image forming operation concerned.

Yet further, the image forming control program described in the aforementioned embodiment of the present invention is one of various kinds of application programs to be executed by the computer 10, and may be such a comprehensive program that includes a printing function. In addition, the image forming control program described in the aforementioned embodiment of the present invention may be a simplified one, such as a printer driver or the like, which is to be executed by the computer 10.

What is claimed is:

1. An image forming apparatus, comprising:
   a receiver that receives a print job from an external computer, wherein the print job includes image data and job setting data;
   a printer circuit that forms an image onto a paper sheet based on the image data; and
   a controller that parses the print job inputted by the receiver, and controls the printer circuit to make the printer circuit implement an image forming operation based on the job setting data,
   wherein the job setting data comprises a setting item, in which a setting character string is set,
   the setting character string comprises an original character string and a separately-setup character string,
   the controller separates the separately-setup character string from the setting character string currently set in the setting item included in the job setting data,
   the separately-setup character string represents a specific setting different from a setting of the original character string established for the setting item, and
   the controller controls the printer circuit to implement the image forming operation based on the specific setting represented by the separately-setup character string and the setting represented by the original character string.

2. The image forming apparatus of claim 1,
   wherein a paper sheet processing apparatus is coupled to the image forming apparatus, and
   wherein the controller applies the separately-setup character string to a paper sheet processing to be implemented in the paper sheet processing apparatus.

3. The image forming apparatus of claim 1,
   wherein, with respect to the image forming operation or the paper sheet processing, the controller establishes the separately-setup character string at such an item or a value that cannot be established in an external apparatus, which creates the print job.

4. The image forming apparatus of claim 1,
   wherein, focusing onto a specific character string established in advance, among the setting character string, the controller recognizes a delimiter between the original character string and the separately-setup character string.

5. The image forming apparatus of claim 1,
   wherein, in a case where a value of another setting item included in the job setting data is a specific value established in advance, the controller determines that the separately-setup character string exists.

6. The image forming apparatus of claim 1,
   wherein, referring to a table provided in advance, the controller converts the separately-setup character string to the specific setting represented by the separately-setup character string concerned.

7. An image forming control apparatus, comprising:
   a receiver that receives a print job from an external computer, wherein the print job includes image data and job setting data;
   a controller that parses the print job inputted by the receiver; and
   a transmitter that transmits the print job to an image forming apparatus,
   wherein the job setting data comprises a setting item, in which a setting character string is set,
   the setting character string comprises an original character string and a separately-setup character string,
   the controller separates the separately-setup character string from the setting character string currently set in the setting item included in the job setting data,
   the separately-setup character string represents a specific setting different from a setting of the original character string established for the setting item, and
   the controller reconstructs the job setting data so that the job setting data includes the specific setting represented by the separately-setup character string and the setting represented by the original character string, and controls the transmitter to transmit the print job, which includes the job setting data reconstructed, to the image forming apparatus, wherein the image forming apparatus comprises a printer circuit that implements an image forming operation based on the specific setting represented by the separately-setup character string and the setting represented by the original character string.

8. The image forming control apparatus of claim 7, wherein, with respect to an image forming operation or a paper sheet processing, the controller establishes the separately-setup character string at such an item or a value that cannot be established in an external apparatus, which creates the print job.

9. The image forming control apparatus of claim 7, wherein, focusing onto a specific character string, established in advance, among the setting character string, the controller recognizes a delimiter between the original character string and the separately-setup character string.

10. The image forming control apparatus of claim 7, wherein, in a case where a value of another setting item included in the job setting data is a specific value established in advance, the controller determines that the separately-setup character string exists.

11. The image forming control apparatus of claim 7, wherein, referring to a table provided in advance, the controller converts the separately-setup character string to the specific setting represented by the separately-setup character string concerned.

12. An image forming system, comprising:
a receiver that receives a print job from an external computer, wherein the print job includes image data and job setting data;
a printer circuit that forms an image onto a paper sheet based on the image data;
a paper sheet processing apparatus that applies a paper sheet processing to the paper sheet on which the image is formed by the printer circuit; and
a controller that parses the print job inputted by the receiver, and controls the printer circuit to make the printer circuit implement an image forming operation based on the job setting data, and also controls the paper sheet processing apparatus to make the paper sheet processing apparatus implement a paper sheet processing based on the job setting data;
wherein the job setting data comprises a setting item, in which a character string is set,
the character string comprises an original character string and a separately-setup character string,
the controller separates the separately-setup character string from the setting character string currently set in the setting item included in the job setting data,
the separately-setup character string represents a specific setting different from a setting of the original character string established for the setting item, and
the controller controls the printer circuit to implement the image forming operation based on the specific setting represented by the separately-setup character string and the setting represented by the original character string.

13. The image forming system of claim 12, wherein, with respect to the image forming operation or the paper sheet processing, the controller establishes the separately-setup character string at such an item or a value that cannot be established in an external apparatus, which creates the print job.

14. The image forming system of claim 12, wherein, focusing onto a specific character string, established in advance, among the setting character string, the controller recognizes a delimiter between the original character string and the separately-setup character string.

15. The image forming system of claim 12, wherein, in a case where a value of another setting item included in the job setting data is a specific value established in advance, the controller determines that the separately-setup character string exists.

16. The image forming system of claim 12, wherein, referring to a table provided in advance, the controller converts the separately-setup character string to the specific setting represented by the separately-setup character string concerned.

17. A non-transitory computer readable storage medium storing a computer executable program for implementing controlling operations in an image forming system that includes: a receiver that receives a print job from an external computer, wherein the print job includes image data and job setting data; a printer circuit that forms an image onto a paper sheet based on the image data; a paper sheet processing apparatus that applies a paper sheet processing to the paper sheet on which the image is formed by the printer circuit; and a controller that parses the print job inputted by the receiver, and controls the printer circuit to make the printer circuit implement an image forming operation based on the job setting data, and also controls the paper sheet processing apparatus to make the paper sheet processing apparatus implement a paper sheet processing based on the job setting data, the program being executable by a computer to cause the computer to perform a process comprising:
separating a separately-setup character string from a setting character string currently set in a setting item included in the job setting data,
wherein the setting character string comprises an original character string and the separately-setup character, and the separately-setup character string represents a specific setting different from a setting of the original character string established for the setting item; and
controlling the printer circuit to implement the image forming operation and the paper sheet processing apparatus to implement the paper sheet processing, based on the specific setting represented by the separately-setup character string and the setting represented by the original character string.

18. The non-transitory computer readable storage medium of claim 17, wherein, with respect to the image forming operation or the paper sheet processing, the controller establishes the separately-setup character string at such an item or a value that cannot be established in an external apparatus, which creates the print job.

19. The non-transitory computer readable storage medium of claim 17, wherein, focusing onto a specific character string, established in advance, among the setting character string, the controller recognizes a delimiter between the original character string and the separately-setup character string.

20. The non-transitory computer readable storage medium of claim 17, wherein, in a case where a value of another setting item included in the job setting data is a specific value established in advance, the controller determines that the separately-setup character string exists.

21. The non-transitory computer readable storage medium of claim 17, wherein, referring to a table provided in advance, the controller converts the separately-setup character string to the specific setting represented by the separately-setup character string concerned.

* * * * *